(12) United States Patent
Van Doorselaer et al.

(10) Patent No.: US 11,689,947 B2
(45) Date of Patent: **\*Jun. 27, 2023**

(54) METHOD FOR EVALUATING A WIRELESS LINK, RESPECTIVE DEVICE, COMPUTER PROGRAM AND STORAGE MEDIUM

(71) Applicant: AIRTIES BELGIUM SPRL, Woluwe-Saint-Lambert (BE)

(72) Inventors: Karel Van Doorselaer, Edegem (BE); Koen Van Oost, Borsbeek (BE); Nick Godman, Deurne (BE)

(73) Assignee: AIRTIES BELGIUM SPRL, Woluwe-Saint-Lambert (BE)

( \* ) Notice: Subject to any disclaimer, the term of this patent is extended or adjusted under 35 U.S.C. 154(b) by 0 days.

This patent is subject to a terminal disclaimer.

(21) Appl. No.: 17/327,125

(22) Filed: May 21, 2021

(65) Prior Publication Data
US 2021/0282039 A1    Sep. 9, 2021

Related U.S. Application Data

(63) Continuation of application No. 15/559,219, filed as application No. PCT/EP2016/055839 on Mar. 17, 2016, now Pat. No. 11,019,511.

(30) Foreign Application Priority Data

Mar. 20, 2015    (EP) ..................................... 15305406

(51) Int. Cl.
*H04W 24/08*    (2009.01)
*H04L 43/0882*    (2022.01)
(Continued)

(52) U.S. Cl.
CPC ............. *H04W 24/08* (2013.01); *H04L 43/04* (2013.01); *H04L 43/0882* (2013.01);
(Continued)

(58) Field of Classification Search
None
See application file for complete search history.

(56) References Cited

U.S. PATENT DOCUMENTS 6,532,308 B1 \* 3/2003 Goertzen ................ H04N 19/63
375/E7.059
7,616,596 B2 \* 11/2009 Lee ...................... H04W 52/367
370/328
(Continued)

FOREIGN PATENT DOCUMENTS

| CN | 101009933 | 5/2010 |
|---|---|---|
| CN | 104022859 | 9/2014 |

(Continued)

*Primary Examiner* — Khaled M Kassim
*Assistant Examiner* — Berhanu D Belete
(74) *Attorney, Agent, or Firm* — Volpe Koenig (57) ABSTRACT

The present disclosure is directed towards a device and a method for evaluating a wireless link (3) of a wireless node of a customer premises equipment (CPE) device (1, 2) during operation of the CPE device. The device and method includes determining an actual data rate (33) of the wireless link, determining an available data rate (31) of the wireless link, and calculating a headroom (34) based on a required data rate (30) and the available data rate (31).

14 Claims, 5 Drawing Sheets

(51) Int. Cl.
*H04L 43/0894* (2022.01)
*H04L 43/04* (2022.01)
*H04L 41/147* (2022.01)
*H04L 41/5067* (2022.01)
*H04W 84/12* (2009.01)

(52) U.S. Cl.
CPC ........ *H04L 43/0894* (2013.01); *H04L 41/147* (2013.01); *H04L 41/5067* (2013.01); *H04W 84/12* (2013.01)

(56) References Cited

U.S. PATENT DOCUMENTS

| | | | | |
|---|---|---|---|---|
| 7,706,804 | B2* | 4/2010 | Huh | H04W 72/10 455/450 |
| 7,830,817 | B1 | 11/2010 | Oh et al. | |
| 7,970,920 | B1* | 6/2011 | Dinan | H03M 13/35 709/230 |
| 8,126,454 | B2* | 2/2012 | Montemurro | H04L 43/0847 455/515 |
| 8,315,661 | B2* | 11/2012 | Zong | H04W 52/16 455/226.1 |
| 8,355,434 | B2 | 1/2013 | Christison | |
| 8,549,405 | B2* | 10/2013 | Bugenhagen | H04L 41/5009 709/224 |
| 10,779,279 | B2 | 9/2020 | Takahashi et al. | |
| 2004/0001536 | A1 | 1/2004 | Lohtia et al. | |
| 2005/0030953 | A1 | 2/2005 | Vasudevan et al. | |
| 2005/0083879 | A1 | 4/2005 | Peek | |
| 2006/0221847 | A1* | 10/2006 | Dacosta | H04W 28/22 370/252 |
| 2007/0099647 | A1* | 5/2007 | Lee | H04W 72/1284 455/63.1 |
| 2007/0121547 | A1 | 5/2007 | Huh et al. | |
| 2007/0233895 | A1* | 10/2007 | Ramachandran | H04W 28/0215 709/238 |
| 2008/0040757 | A1 | 2/2008 | Romano et al. | |
| 2008/0052628 | A1 | 2/2008 | Bugenhagen et al. | |
| 2008/0069006 | A1 | 3/2008 | Walter et al. | |
| 2008/0084819 | A1* | 4/2008 | Parizhsky | H04L 47/2441 370/230 |
| 2008/0108352 | A1 | 5/2008 | Montemurro et al. | |
| 2008/0144497 | A1* | 6/2008 | Ramprashad | H04L 41/5019 370/230.1 |
| 2009/0116384 | A1* | 5/2009 | Kim | H04L 47/805 370/230 |
| 2009/0238136 | A1* | 9/2009 | Sambhwani | H04W 52/365 370/329 |
| 2010/0002580 | A1* | 1/2010 | DelRegno | H04L 47/10 370/252 |
| 2010/0020707 | A1* | 1/2010 | Woodings | H04W 24/08 370/252 |
| 2010/0029320 | A1* | 2/2010 | Malladi | H04B 7/0404 375/261 |
| 2010/0158147 | A1 | 6/2010 | Zhang et al. | |
| 2010/0254261 | A1 | 10/2010 | Dattagupta et al. | |
| 2011/0110231 | A1* | 5/2011 | Langford | H04L 47/822 370/232 |
| 2011/0261694 | A1 | 10/2011 | DelRegno et al. | |
| 2012/0033656 | A1* | 2/2012 | De Maaijer | H03F 3/195 370/338 |
| 2012/0108288 | A1 | 5/2012 | Montemurro et al. | |
| 2012/0113890 | A1 | 5/2012 | Chen et al. | |
| 2013/0028231 | A1* | 1/2013 | Zhang | H04W 72/0453 370/329 |
| 2013/0070611 | A1* | 3/2013 | Ahn | H04W 52/286 370/328 |
| 2013/0128856 | A1* | 5/2013 | Iwai | H04L 5/001 370/329 |
| 2013/0155984 | A1* | 6/2013 | Marinier | H04W 72/1284 370/329 |
| 2013/0326047 | A1* | 12/2013 | Easty | H04L 43/0876 709/224 |
| 2013/0343221 | A1 | 12/2013 | Woodings | |
| 2014/0329551 | A1* | 11/2014 | Ryoo | H04W 76/27 455/522 |
| 2015/0215577 | A1* | 7/2015 | Ramachandran | H04N 7/147 348/14.02 |
| 2016/0081044 | A1* | 3/2016 | Wang | H04W 52/365 370/329 |
| 2016/0044178 | A1 | 5/2016 | Narayanaswanny et al. | |
| 2016/0128004 | A1 | 5/2016 | Lee et al. | |
| 2016/0309426 | A1* | 10/2016 | Zhang | H04W 52/146 |
| 2017/0078983 | A1* | 3/2017 | Ahn | H04W 52/38 |
| 2017/0223643 | A1* | 8/2017 | Ahn | H04W 72/0446 |
| 2017/0230936 | A1* | 8/2017 | Stanwood | H04W 72/10 |
| 2018/0007641 | A1* | 1/2018 | Vishwanathan | H04W 52/365 |
| 2018/0070322 | A1* | 3/2018 | Ahn | H04W 52/365 |
| 2018/0310259 | A1* | 10/2018 | Kim | H04W 52/54 |
| 2018/0317183 | A1* | 11/2018 | Ahn | H04W 52/365 |
| 2019/0132842 | A1 | 5/2019 | Takahashi et al. | |
| 2019/0246361 | A1* | 8/2019 | Zhang | H04W 52/346 |
| 2019/0349869 | A1 | 11/2019 | Vishwanathan et al. | |

FOREIGN PATENT DOCUMENTS

| | | |
|---|---|---|
| IN | 201101474 | 7/2012 |
| JP | 2003-018158 | 1/2003 |
| WO | 2008/016786 | 2/2008 |
| WO | 2015/044343 | 4/2015 |

\* cited by examiner

METHOD FOR EVALUATING A WIRELESS LINK, RESPECTIVE DEVICE, COMPUTER PROGRAM AND STORAGE MEDIUM

CROSS REFERENCE TO RELATED APPLICATIONS

This application is a continuation of U.S. patent application Ser. No. 15/559,219 which was filed on Sep. 18, 2017, which claims the benefit, under 35 U.S.C. § 371 of International Application PCT/EP2016/055839, filed Mar. 17, 2016, which was published on Sep. 29, 2017 in English and which claims the benefit of European Patent Application No. 15305406.9, filed Mar. 20, 2015, the contents of which are hereby incorporated by reference herein.

TECHNICAL FIELD

The present disclosure relates to the field of wireless nodes and respective devices communicating with each other via a wireless communication.

BACKGROUND

Access gateways are widely used to connect devices in a home to the Internet or any other wide area network (WAN). Access gateways use in particular digital subscriber line (DSL) technology that enables a high data rate transmission over copper lines or optical lines. Residential gateways, as well as other devices such as routers, switches, telephones and set-top boxes, are understood in this context as customer premises equipment (CPE) devices.

Access gateways including wireless technology have a key role in today's home and professional environments. A mechanism for connecting wireless devices to a local area network (LAN) is called Wi-Fi, which is a brand name of the Wi-Fi Alliance for devices using the IEEE 802.11 family of standards for wireless data transmission. The IEEE 802.11 standards define two types of wireless nodes, a general wireless device that can connect to other devices called a station (denoted as STA) and a special type of a STA that is in control of the network, namely an access point (denoted AP). A Wi-Fi network, often called a WLAN (wireless local area network), includes an AP with one or several STA connected to the AP.

Due to its flexible and "invisible" nature, a lot of LAN applications are utilizing Wi-Fi rather than the classical wired Ethernet approach. This widespread usage of wireless LAN has exposed however a serious downside of using a shared medium technology: interference. Interference, both Wi-Fi and non-Wi-Fi related, leads to a degraded user experience due to the nature of IEEE 802.11. In its most common form, IEEE 802.11 networks apply a medium access method in which collisions are avoided by sensing that the medium is used (denoted as CSMA-CA). The medium access method is also commonly known as "listen before talk", describing the essence of the method. Interference of any nature can hence block the medium and force all nodes to remain silent.

Another impact of interference can be packet loss at the receiver side, leading to a reduction of the physical layer rate. The physical layer rate, also referred to in the following as "TrainedPhyRate" or modulation rate, relates to the transfer rate on the physical layer of the wireless connection. The IEEE 802.11 MAC protocols use rate adaptation mechanisms for evaluating the properties of the wireless channel and select an appropriate physical layer rate. In this case, the interference is not detected by the CCA of the transmitter, but is decreasing the SINR (Signal to Noise and Interference Ratio) of the Wi-Fi packets as seen by the receiver. Typically, Wi-Fi nodes will react to packet loss by lowering the physical layer rate used towards a more robust—but slower—physical layer rate in an attempt to increase the chance of successfully transmitting packets.

Therefore, in certain circumstances, the Wi-Fi connection can suffer from poor performance and even connection loss. Some of these circumstances are obvious and easy to explain to an end user. For example, if the distance between the station and the access point is too large, then signal levels are low and performance will degrade. Other circumstances are "invisible" and not understood by the end user, e.g. a hidden node. A hidden node is invisible to some of the nodes of a network, leading to a practical failure of the CSMA-CA method, which can cause packet collision/corruption over air. In many cases, the end user is not able to diagnose the problem source and correct the issue.

For in-home Wi-Fi networks, connectivity and performance issues are correspondingly one of the main Internet service provider support costs and causes for help-desk calls. Internet service providers are therefore searching for ways to get a better understanding of the end user's wireless environment including link quality and performance.

SUMMARY

A method for evaluating a wireless link of a wireless node of a customer premises equipment (CPE) device during operation of the CPE device comprises: determining an actual data rate of the wireless link, determining an available data rate of the wireless link, and calculating a headroom based on the actual data rate and the available data rate. The headroom is calculated in particular by including a difference between the available data rate and the actual data rate, wherein the actual data rate is measured by the CPE device.

In an aspect of the disclosure, an assessment value is calculated by including a ratio of the actual data rate and the headroom, and/or a sum of the actual data rate and the headroom.

In one embodiment, the ratio of the assessment value is a ratio between a first constant added to the actual data rate, and a second constant added to the headroom, wherein the first and the second constants are the same.

In another embodiment, an assessment value is determined, which is based on a look-up table.

A computer program, being executable by a processor, comprises executable program code for performing the method.

A non-transitory program storage medium, being readable by a processor, comprises executable program code for performing the method.

A device includes a processor, a memory and a wireless node, wherein the processor is adapted to determine an actual data rate of the wireless link, determine an available data rate of the wireless link, and calculate a headroom based on a the actual data rate and the available data rate. The device may be, in particular, an access point according to IEEE 802.11, for example an access gateway.

BRIEF DESCRIPTION OF THE DRAWINGS

Exemplary embodiments of the present disclosure are explained in more detail below by way of example with reference to schematic drawings, which show.

It should be understood that the drawings are for purposes of illustrating the concepts of the disclosure and is not necessarily the only possible configuration for illustrating the disclosure.

DESCRIPTION OF PREFERRED EMBODIMENTS

Figure 1:
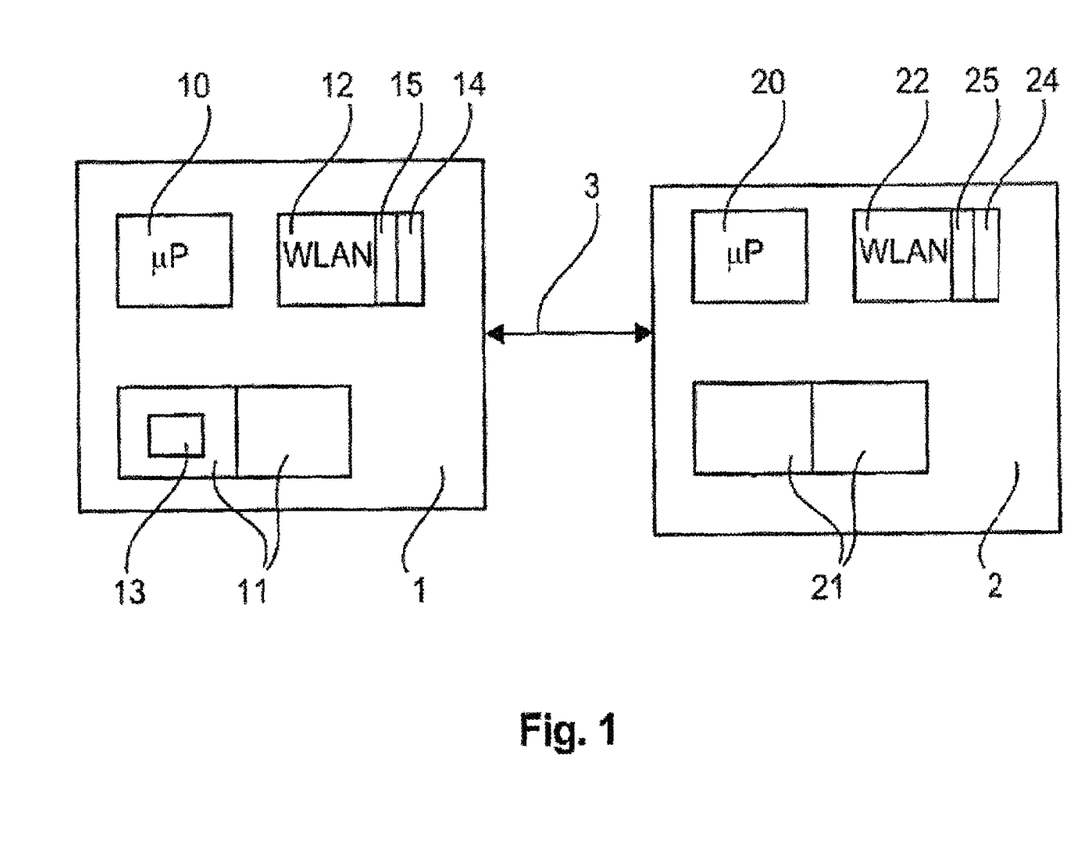
FIG. 1 a system diagram illustrating an access point communicating with a station via a wireless communication, FIG. 2 a chart illustrating a monitor result of a wireless communication according to FIG. 1, FIG. 3 a chart showing the monitor result of FIG. 2, and illustrating a headroom, FIGS. 4a, 4b charts illustrating assessment values of a wireless communication, and FIGS. 5a, 5b an enlarged portion of the charts as illustrated in FIGS. 4a, 4b.

It should be understood that the elements shown in FIG. 1 may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for instructional purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

In the following description, example methods for evaluating a wireless (Wi-Fi) link of a wireless node of an access point, e.g. a customer-premises equipment (CPE) device, or a station are described, as well as a device performing the methods. For purposes of explanation, various specific details are set forth in order to provide a thorough understanding of preferred embodiments. It will be evident, however, to one skilled in the art that the present disclosure may be practiced without these specific details.

A CPE device includes, but is not limited to, for example a controller, e.g. a microprocessor, a memory, in which an operating system is stored for the operation of the CPE device, a wireless node for a wireless communication, and a circuit for a broadband connection, e.g. an xDSL connection. The wireless node includes, but is not limited to, a software driver, a physical layer with data buffers, and an antenna. A CPE device of this kind is for example an access gateway.

The wireless node is controlled by the software driver which executes a number of background tasks during operation of the wireless node, e.g. dynamic rate adaptation, packet aggregation, channel quality monitoring, and the like. On top of signal manipulations, the wireless driver also embeds an IEEE 802.11 protocol stack with the associated IEEE defined management and control messaging. The wireless driver will hence inject a number of management and control packets in the data stream, making it difficult to analyze a link by transparently looking at the data frame exchange only.

An arrangement illustrating a wireless communication is schematically depicted in FIG. 1: An access point 1 communicates with a station 2 via a wireless link 3. The access point 1 includes a circuit comprising a microprocessor 10, a memory 11, a wireless node 12 for the wireless link, and a monitor application 13. The station 2 includes a second circuit comprising a microprocessor 20, a memory 21, and a wireless node 22 for the wireless link. The wireless node 12 includes a physical layer 14 and a link layer 15, and the wireless node 22 includes a physical layer 24 and a link layer 25. The access point 1 is in particular a CPE device, for example a residential gateway establishing with the station 2 a home network of an end user. The monitor application 13 is included for analyzing and evaluating the wireless link 3 and retrieves in particular performance parameters of the wireless link 3.

Figure 2:
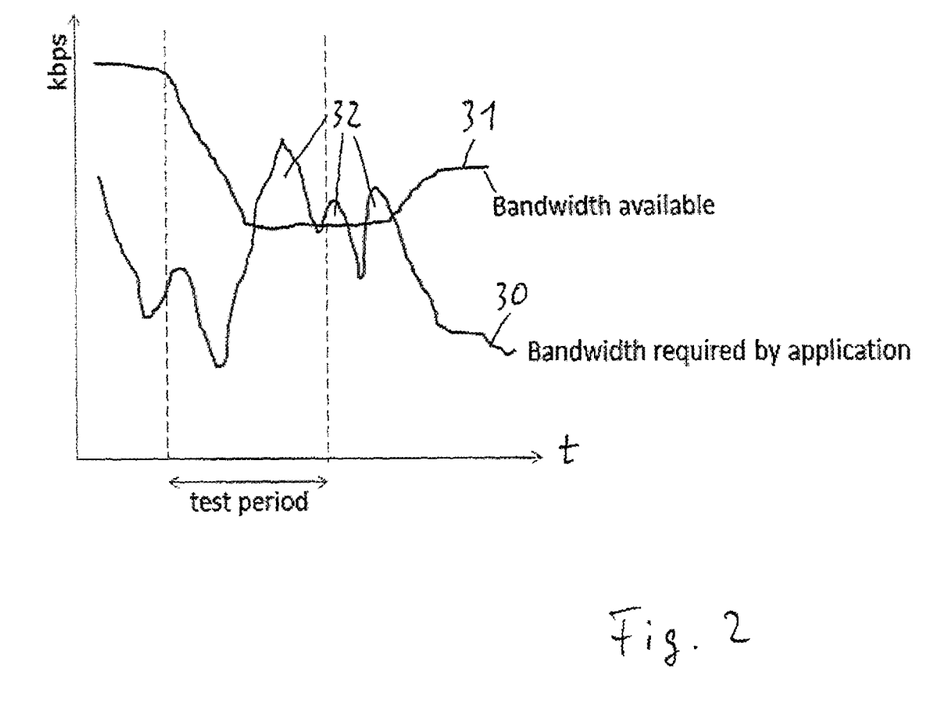

A diagram illustrating an exemplary performance of the wireless link 3 according to FIG. 1 is shown in FIG. 2. A line 30 ("Bandwidth required by application") represents a data rate over the wireless link 3 as required by an application included in the station 2, e.g. a video application forcing a video streaming. A line 31 ("Bandwidth available") represents a data rate that is available over this given wireless link 3 at a certain time t. Both rates are expressed in kbit/sec. In the example shown, there are moments 32 where the available data rate 31 is lower than the data rate 30 as required by the application. At these moments, the wireless link 3 will limit the data rate provided to the application, which might be visible to the end user. This depends on the nature of the application. E.g. for video streaming, typically the video player will implement a jitter buffer which will make short bandwidth limitations invisible to the end user. As a result, it is difficult to make a hard prediction about visible end user issues.

The actual data rate of the wireless link 3 is therefore the required data rate 30, when there exists sufficient available bandwidth 31, and is equal to the available bandwidth 31, in case the available bandwidth 31 is not sufficient for the application. The actual data rate can be measured within the access point 1.

A method for determining the available bandwidth 31 is disclosed for example in the international application WO 2015/044343 of Thomson Licensing. This application is hereby incorporated by reference.

Figure 3:
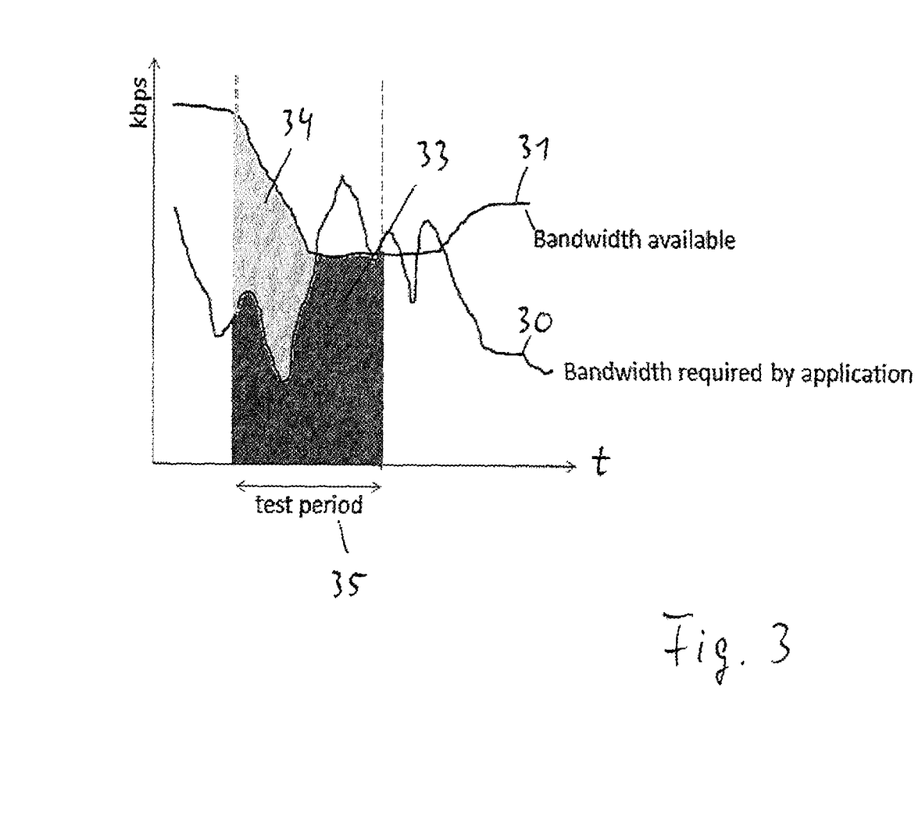

FIG. 3 shows the example of FIG. 2, while filling out the actual data rate, 33, dark shaded, and an observed headroom, 34, light shaded, during a monitor or test period 35. It is noted that the monitor application typically uses a test period 35 that is longer than the variations in bandwidth: i.e. the data rate and the headroom rates available in the monitor application typically are averaged numbers of the actual data rate 33 and the headroom 34 during the test period 35. This is another reason why the prediction about visible end user issues cannot be "hard": during a test period of e.g. 30 s, the end user could have an average available actual data rate 33 of 10 Mbps and an average headroom 34 of 2 Mbps, but still have very visible Wi-Fi problems, since the available bandwidth 31 is very low during e.g. 10 s within the test period of 30 s.

Now, even though no hard predictions can be made with respect to visible Wi-Fi issues, it is possible to estimate the chance that a given situation, depending on the actual data rate 33 and headroom 34, might give rise to a visible Wi-Fi issue. The metric applied here is a calculation defining an assessment function Wxi giving an indication of a Wi-Fi end-user experience impairment.

There are a few boundary conditions that help to define the function Wxi:
  If the average headroom 34 is zero, this means that the actual data rate 30 used is clipped to the available data rate 31 for the whole test period—there is no negative headroom. Given that the test period typically is in the order of tens of seconds, the risk for issues visible on the application level are very high. Let's express the function Wxi in %, which means that this boundary condition means that Wxi=100% in case of an average headroom=0 kbps.
  If there is zero traffic over the wireless link 3, and still some headroom 34, even if it is small, the risk for visible Wi-Fi issues is zero: applications are not requiring any bandwidth at such periods.
  It is assumed that Wi-Fi issues are independent of the capabilities, like maximum speed, of the wireless link, but only dependent on the average actual data rate 33 and the average headroom 34.

Next to that, there is the requirement that the function Wxi should be a sharp, surely non-linear function that emphasizes issues, which allows to average over a large dataset and still bring out a clear result.

As FIG. 3 indicates, a determining factor for the function Wxi is the ratio of the average actual data rate 33 over the average headroom 34, with a correction factor to make sure that not only high data rates result in high Wxi values. The following formula can be used to express that effect:

$$Wxi = \frac{(\text{Datarate (kbps)} + C1)}{(\text{Headroom (kbps)} + C2)} \cdot \frac{C3}{(\text{Datarate (kbps)} + \text{Headroom (kbps)} + C4)}$$

"Datarate"=actual data rate 33, "Headroom"=headroom 34, and with constants C1-C4 tuned to fulfil above boundary conditions:
  C1=C2=C4=500 kbps
  C3=50 000 kbps The function Wxi is used in this embodiment as a truncated integer function—to avoid low values below 1 which would introduce noise in long term averages. Wxi can be averaged over time. If the test period changes over time, this shall be taken into account for the averaging. The function Wxi is calculated for each wireless link. In order to assess the risk for visible Wi-Fi issues for a given access point, the Wxi values of all of the different wireless links of the stations being linked with that access point are added.

Alternatively, a look-up table can be used instead of the function Wxi, the look-up table taking into account the boundary conditions as described before.

For an embodiment in accordance with FIG. 1: In case the access point 1 is coupled with two or more stations 2 via a respective wireless link, for each wireless link of the access point 1 with a respective station 2 an assessment value is calculated, and all calculated assessment values are accumulated, to have an indication of the link quality of the access point 1.

Only the bandwidth available on the access point 1 is not a good metric for indicating, flagging or bringing out Wi-Fi problems that are reducing the end user experience, in particular for problems where the wireless link is the bottleneck for the bandwidth available to the applications that the end user is using. For example, the bandwidth of a given wireless link might be drastically reduced by an interferer from 100 Mbps to 5 Mbps, wherein the end user is still perfectly happy since the application he is using, e.g., audio streaming, is not affected by the interference.

The method uses the notion of the headroom 34—the bandwidth available but not used by the wireless link—and combines this with the actual data rate 33—i.e. the bandwidth used by an application. This requires to include the available data rate 31, which can be obtained, for example, by using a passive monitoring of the wireless link 3. Lack of headroom at moments when an application is consuming bandwidth indicates that the wireless link has become the bottleneck, which risks to be visible to the end user on application level. Therefore, the described method is defined by using both the actual data rate 33 and the headroom 34. With the method, it is possible to detect Wi-Fi problems affecting end user satisfaction, and allows therefore to concentrate on real visible Wi-Fi problems rather than just trying to increase the bandwidth of the wireless link, also in cases where no visible Wi-Fi problems occur. With an appropriate back end infrastructure, it has now become possible for a network service provider to closely monitor the performance of a wireless link of an end user by using the described method. A knowledge of which applications are running on the site of the end user is not required, the method does not make assumptions on that. With the method, a metric is given which tries to estimate the risk for "a general application".

Figure 4A:
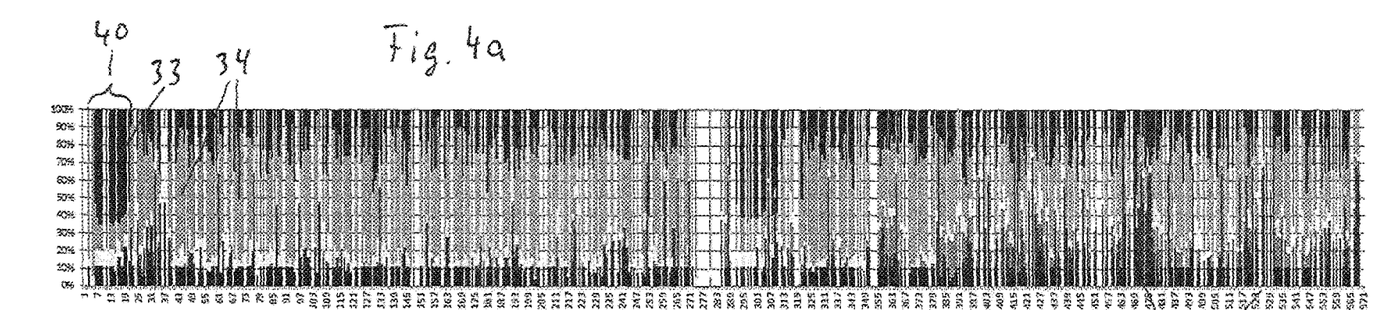
Figure 4B:
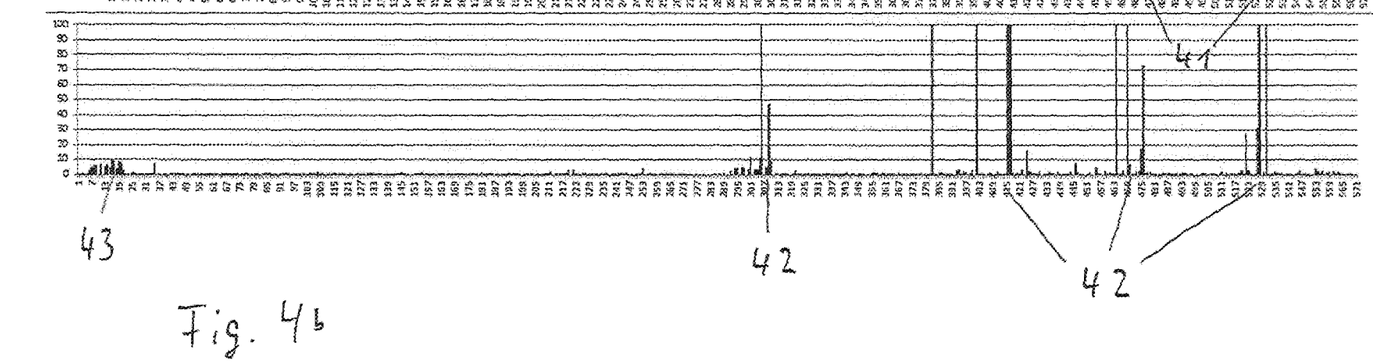

FIGS. 4a, 4b show an example of how the function Wxi reflects visible Wi-Fi issues. The top diagram, FIG. 4a, shows monitoring results of a Wi-Fi link between a residential gateway and a Play Station 3 that is used to watch Netflix movies. The monitoring graph uses the same colour scheme as the examples given before: dark shaded is the actual data rate 33, and light shaded is the headroom 34. Test period in this case is 30 s. On the left side of FIG. 4a, the buffering and the streaming of a first episode is depicted, time marks 1-277. On the right side of FIG. 4a, time marks 283-571, a second episode is buffered and streamed.

The second diagram below, FIG. 4b, shows Wxi values according to the formula given above. For the first episode, at the beginning, the headroom 34 is getting smaller during the initial buffering 40, indicated by non-zero, yet small Wxi values 43: the Wi-Fi conditions here are affecting the time needed for buffering. After buffering, time marks 25-277, sufficient headroom 34 is available, and the Wxi values are about zero. During the second episode, however, far-end interference 41, dark columns, is present and is reducing the headroom from time to time, both during buffering, time marks 283-313, and during subsequent streaming. The effects of that are visible to the end user, and reflected by high Wxi values 42, sometimes up to 100%, indicating that the bandwidth is limited by the Wi-Fi interference during the entire 30 s test period.

Figures 5A, 5B:
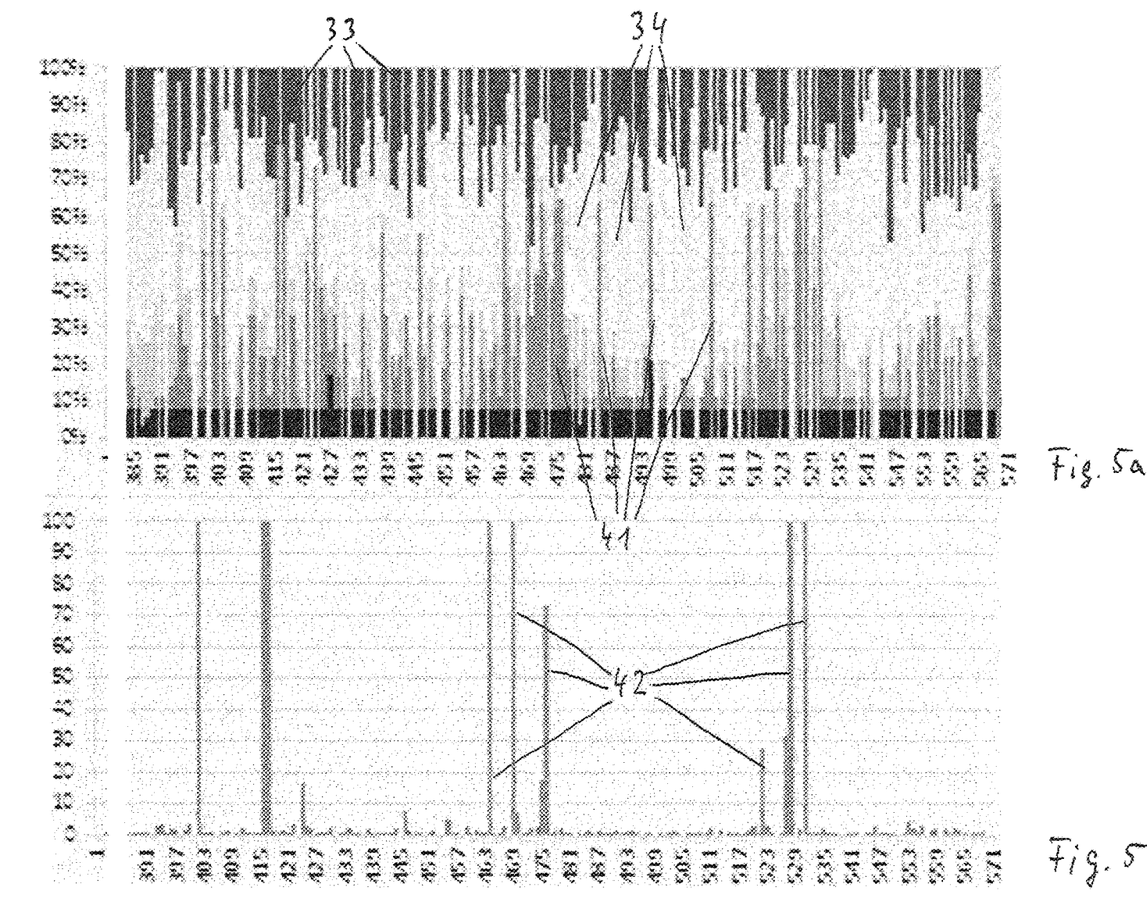

The final part of FIGS. 4a, 4b with the time marks 391-571 is enlarged and depicted in FIGS. 5a, 5b. As can be seen, the high Wxi values 42 are essentially caused by high far-end interference values 41.

Also other embodiments of the present disclosure may be utilized by one skilled in the art without departing from the scope of the present disclosure. The method as described may be used in particular for all kinds of access points using a wireless transmission, e.g. in accordance with IEEE 802.11. The present disclosure resides therefore in the claims herein after appended.

Although embodiments which incorporate the teachings of the present disclosure have been shown and described in detail herein, those skilled in the art can readily devise many other varied embodiments that still incorporate these teachings. Having described preferred embodiments (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure.

What is claimed:

1. A method implemented by an Access Point (AP) for evaluating a plurality of wireless links between a plurality of stations and the AP, wherein each station of the plurality of stations has one wireless link of the plurality of wireless links to the AP, the method comprising:

measuring an actual data rate, exclusively from the AP, of each wireless link between the plurality of stations and the AP by monitoring data transferred on each wireless link, wherein the AP is an 802.11 AP that is part of an 802.11 wireless local area network (WLAN);

determining an available data rate of each wireless link;

calculating a bandwidth headroom based on the actual data rate and the available data rate;

calculating a plurality of assessment values for each wireless link over a period of time based on the actual data rate, a boundary constant, and the bandwidth headroom;

normalizing the plurality of assessment values over the period of time;

determining an indication of link quality for the AP based on the normalized plurality of assessment values; and sending the indication of the link quality to a service provider of the AP that resides outside of the WLAN of the AP.

2. The method of claim 1, wherein the calculating bandwidth headroom is based on a look up table or a formula.

3. The method of claim 2, wherein the formula further includes a first constant (C1) added to the actual data rate, and a second constant (C2) add to the bandwidth headroom.

4. The method of claim 3, wherein the first and the second constants (C1, C2) are determined by boundary conditions.

5. The method of claim 2, wherein the formula is:

$$((DR+C1) \times C3)/((\text{bandwidth headroom}+C2) \times (DR+\text{headroom}+C4)),$$

wherein DR is the actual data rate, C1 is a first constant, C2 is a second constant, and C3 is a third constant and C4 is a fourth constant.

6. The method of claim 5, wherein $C3=C1$, or $C3=100 \times C1$.

7. The method of claim 1, wherein the calculating the bandwidth headroom is further based on a difference between the available data rate and the actual data rate of the wireless link between the station and the AP.

8. An Access Point (AP) for evaluating a plurality of wireless links between a plurality of stations and the AP, wherein each station of the plurality of stations has one wireless link of the plurality of wireless links to the AP, the AP comprising a processor operatively coupled to a transceiver, the processor and transceiver configured to measure an actual data rate, exclusively from the AP, of each wireless link between the plurality of stations and the AP by monitoring data transferred on each wireless link, wherein the AP is an 802.11 AP that is part of an 802.11 wireless local area network (WLAN);

determine an available data rate of each wireless link;

calculate a bandwidth headroom based on the actual data rate and the available data rate;

calculate a plurality of assessment values for each wireless link over a period of time based on the actual data rate, a boundary constant, and the bandwidth headroom;

normalize the plurality of assessment values over the period of time;

determine an indication of link quality for the AP based on the normalized plurality of assessment values; and send the indication of the link quality to a service provider of the AP that resides outside of the WLAN of the AP.

9. The AP of claim 8, wherein the calculating the bandwidth headroom is based on a look up table or a formula.

10. The AP of claim 9, wherein the formula further includes a first constant (C1) added to the actual data rate, and a second constant (C2) added to the bandwidth headroom.

11. The AP of claim 10, wherein the first and the second constants (C1, C2) are determined by boundary conditions.

12. The AP of claim 9, wherein the formula is:

$$((DR+C1) \times C3)/((\text{bandwidth headroom}+C2) \times (DR+\text{headroom}+C4)),$$

wherein DR is the actual data rate, C1 is a first constant, C2 is a second constant, and C3 is a third constant and C4 is a fourth constant, and wherein C3=C1, or C3=100×C1.

13. The AP of claim 9, wherein C3=C1, or C3=100×C1.

14. The AP of claim 8, wherein the calculating the bandwidth headroom is further based on a difference between the available data rate and the actual data rate of the wireless link between the station and the AP.

* * * * *